United States Patent
Nelson

(10) Patent No.: US 10,481,043 B2
(45) Date of Patent: Nov. 19, 2019

(54) METHOD FOR SMALL LEAK TESTING OF AN EVAPORATIVE EMISSIONS SYSTEM

(71) Applicant: GM GLOBAL TECHNOLOGY OPERATIONS LLC, Detroit, MI (US)

(72) Inventor: Todd W Nelson, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 206 days.

(21) Appl. No.: 15/702,397

(22) Filed: Sep. 12, 2017

(65) Prior Publication Data

US 2019/0078976 A1  Mar. 14, 2019

(51) Int. Cl.
*F02M 25/08* (2006.01)
*F02M 33/04* (2006.01)
*G01M 15/04* (2006.01)
*G01M 3/26* (2006.01)

(52) U.S. Cl.
CPC .......... *G01M 15/042* (2013.01); *G01M 3/26* (2013.01)

(58) Field of Classification Search
CPC ...... G01M 3/26; G01M 15/04; G01M 15/042; F02M 25/08; F02M 33/02; F02M 33/04
See application file for complete search history.

(56) References Cited

U.S. PATENT DOCUMENTS

| | | | | |
|---|---|---|---|---|
| 5,158,054 A * | 10/1992 | Otsuka | ............... | F02M 25/0809 123/198 D |
| 5,347,971 A * | 9/1994 | Kobayashi | ......... | F02M 25/0809 123/198 D |
| 5,349,935 A * | 9/1994 | Mezger | ............ | B60K 15/03504 123/198 D |
| 5,511,529 A * | 4/1996 | Blumenstock | ......... | F02M 25/08 123/516 |
| 5,562,757 A * | 10/1996 | Brun | ................ | B60K 15/03504 123/519 |
| 6,105,556 A * | 8/2000 | Takaku | .............. | F02M 25/0809 123/520 |
| 6,112,728 A * | 9/2000 | Schwegler | ......... | F02M 25/0818 123/198 D |
| 9,038,489 B2 * | 5/2015 | Jackson | ............. | F02M 25/0809 73/114.39 |
| 9,212,633 B2 * | 12/2015 | Haag | .................. | F02M 25/0818 |
| 9,422,895 B2 * | 8/2016 | Reddy | .................. | F02M 25/089 |
| 2014/0109882 A1 * | 4/2014 | Hoegl | ..................... | F02B 33/44 123/559.1 |
| 2019/0032613 A1 * | 1/2019 | Miyabe | .................. | F02M 37/00 |

FOREIGN PATENT DOCUMENTS

| | | | | |
|---|---|---|---|---|
| DE | 10131162 A1 * | 1/2003 | ......... | F02M 25/0818 |
| JP | 623736 Y2 * | 8/1988 | ............. | F02M 25/08 |
| WO | WO-2013020824 A1 * | 2/2013 | ......... | F02M 25/0836 |

* cited by examiner

Primary Examiner — Nguyen Q. Ha

(57) ABSTRACT

A method for small leak testing of an evaporative emissions system includes monitoring a vacuum pressure level of the evaporation emissions system with the engine on and actuating a canister vent valve to regulate the vacuum pressure level to a predetermined minimum vacuum pressure level. Upon turning the engine off, the canister vent valve and a canister purge valve are closed to seal the evaporative emissions system. Next, the vacuum pressure level is recorded over a predetermined time period after turning off the engine and a fault code is set when the vacuum pressure level becomes less than the predetermined minimum vacuum pressure level.

15 Claims, 3 Drawing Sheets

METHOD FOR SMALL LEAK TESTING OF AN EVAPORATIVE EMISSIONS SYSTEM

FIELD

The present disclosure relates to an evaporative emissions system and more particularly to a method for small leak testing of an evaporative emissions system.

BACKGROUND

This section provides background information related to the present disclosure which is not necessarily prior art.

Internal combustion engines combust a mixture of air and fuel to generate torque. The fuel may be a combination of liquid fuel and vapor fuel. A fuel system supplies liquid fuel and vapor fuel to the engine. A fuel injector provides the engine with liquid fuel drawn from a fuel tank. An evaporative emissions system, typically including, but not limited to, a fuel tank, a vapor canister, a vent valve, a purge valve, and maybe a purge pump, provides the engine with fuel vapor drawn from the fuel tank and vapor canister.

The liquid fuel stored within the fuel tank may vaporize and form fuel vapor. The vapor canister traps and stores the fuel vapor to prevent it from escaping into the atmosphere from the system. It is known that fuel vapor may sometimes escape into the atmosphere through small leaks in the system, e.g., at the gas cap or other means, that can contribute to air pollution.

Some system tests for fuel vapor leaks rely on heat generated from the engine to produce changes in pressure when the system is closed. However, future fuel efficient engines that produce a low heat signature, may not provide the heat necessary to generate enough pressure for running a leak test. It is desirable to have a fuel vapor leak test suitable for future fuel efficient vehicles having low heat signature engines.

SUMMARY

This section provides a general summary of the disclosure, and is not a comprehensive disclosure of its full scope or all of its features.

In accordance with an exemplary embodiment, a method for small leak testing of an evaporative emissions system includes monitoring a vacuum pressure level of the evaporation emissions system with engine on. Another aspect includes actuating a canister vent valve to regulate the vacuum pressure level to a predetermined minimum vacuum pressure level. And another aspect includes closing the canister vent valve and a canister purge valve when the engine is turned off. Still another aspect includes recording the vacuum pressure level over a predetermined time period after turning off the engine. And still another aspect includes setting a fault code when the vacuum pressure level becomes less than the predetermined minimum vacuum pressure level.

Further aspects in accordance with the exemplary embodiment wherein monitoring further includes monitoring the vacuum pressure level at a fuel tank or at the evaporative emissions vapor canister within the evaporative emissions system using a pressure sensor. And a further aspect wherein actuating further includes opening and closing the canister vent valve with a variable pulse width modulated signal to regulate the vacuum pressure level. Yet another aspect wherein actuating further includes actuating the canister vent valve between a fully open and a fully closed position to regulate the vacuum pressure level. Still another aspect includes controlling duty cycle of a signal applied to the canister purge valve to regulate the vacuum pressure level when the canister vent valve is restricted. And still another aspect wherein actuating further comprises actuating a purge pump to affect regulation of the vacuum pressure level. And one other aspect wherein setting further comprises activating a malfunction indicator lamp when the vacuum pressure level becomes less than the predetermined minimum vacuum pressure level.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
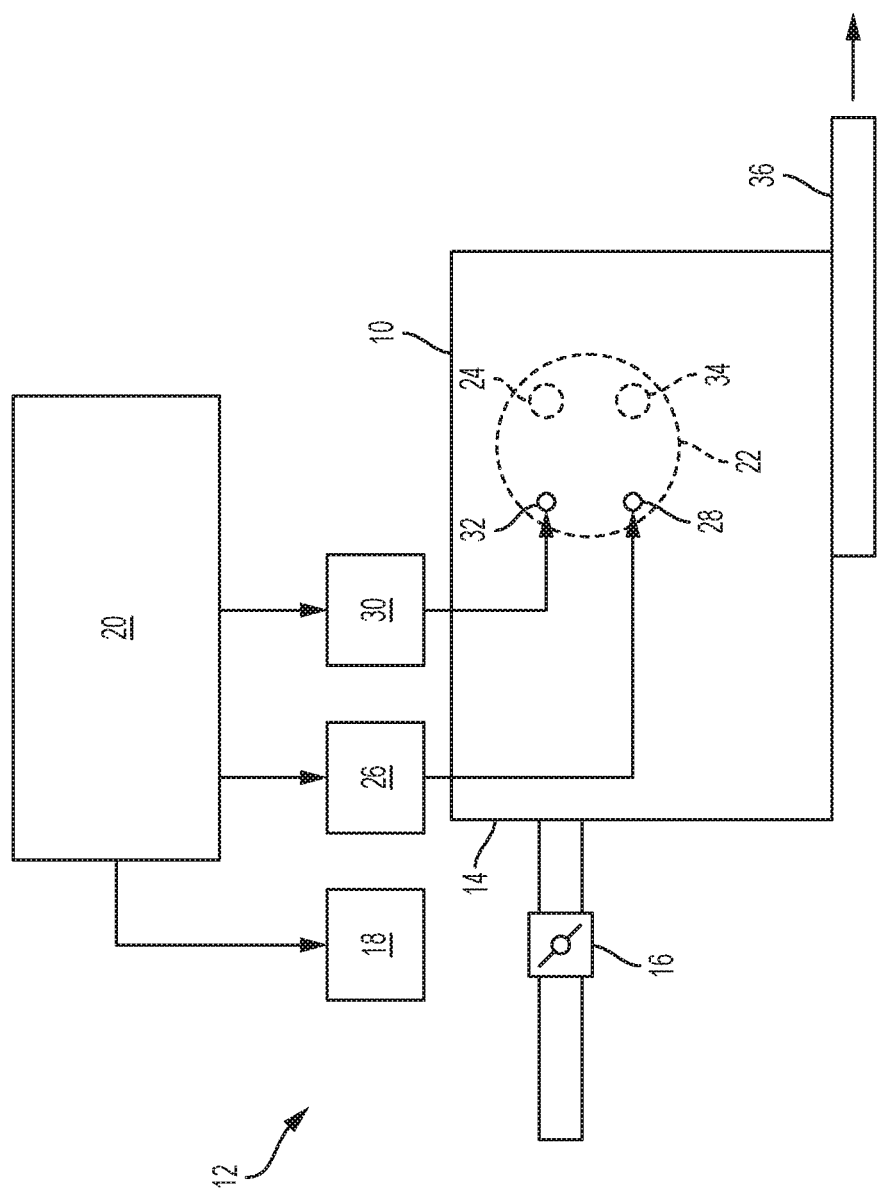
FIG. 1 is a functional block diagram of an example direct injection engine system in accordance with an exemplary embodiment.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

An evaporative emissions system includes a fuel tank and a vapor canister that traps and stores fuel vapor produced from liquid fuel in the fuel tank. A canister purge valve is selectively opened to purge the fuel vapor from the vapor canister to an internal combustion engine. In some types of engines, such as naturally aspirated engines, vacuum within an intake manifold may be used to draw fuel vapor through the canister purge valve. Other types of engines, such as boosted engines, may have insufficient vacuum or boost to draw fuel vapor through the canister purge valve. A pump may be used to pump fuel vapor from the vapor canister to an intake system of engines having insufficient boost or vacuum. Some canister purge valves may be directly coupled to a component of an intake system of an engine.

A control module selectively opens the canister purge valve (which is normally closed) and activates a pump after closing a canister vent valve to provide a vacuum in the evaporative canister emissions system for determining whether there is a leak in the system. The leak could be due to the purge valve being detached from an intake system of an engine, or due to holes in the evaporative canister emissions system.

Closing the canister purge valve prevents fuel vapor flow into the intake system. However, fuel vapor may exit the canister purge valve when the canister purge valve is detached from the intake system. The control module therefore determines whether the canister purge valve is detached based on whether a pressure measured at a location between the fuel tank and the canister purge valve decreases over time when the canister purge valve is closed and the canister vent valve is also closed.

Referring now to FIG. 1, a functional block diagram of an example engine system for a vehicle is presented. An engine 10 combusts an air/fuel mixture to produce drive torque for a vehicle. While the engine 10 will be discussed as a spark ignition direct injection (SIDI) engine, the engine 10 may include another type of engine. One or more electric motors and/or motor generator units (MGUs) may be provided with the engine 10.

Air flows into the engine 10 via an intake system 12. More specifically, air flows into an intake manifold 14 through a throttle valve 16. The throttle valve 16 may vary airflow into the intake manifold 14. A throttle actuator module 18 (e.g., an electronic throttle controller or ETC) controls opening of the throttle valve 16 based on signals from an engine control module (ECM) 20. In various implementations, the intake system 12 includes one or more boost devices, such as one or more superchargers and/or one or more turbochargers that increase airflow into the intake manifold 14 and, therefore, the engine 10.

Air from the intake manifold 14 is drawn into cylinders of the engine 10. While the engine 10 may include more than one cylinder, only a single representative cylinder 22 is shown. Air from the intake manifold 14 is drawn into the cylinder 22 through one or more intake valves of the cylinder 22, such as an intake valve 24. One or more intake valves 24 may be provided with each cylinder 22.

A fuel actuator module 26 controls fuel injectors of the engine 10, such as fuel injector 28, based on signals from the ECM 20. A fuel injector 28 may be provided for each cylinder. The fuel injectors 28 inject fuel, such as gasoline, for combustion within the cylinders. The ECM 20 may control fuel injection to achieve a target air/fuel ratio, such as a stoichiometric air/fuel ratio.

The injected fuel mixes with air and creates an air/fuel mixture in the cylinder 22. Based upon a signal from the ECM 20, a spark actuator module 30 may energize a spark plug 32 in the cylinder 22. A spark plug 32 may be provided for each cylinder. Some types of engines, such as diesel engines, do not include spark plugs. Spark generated by the spark plug 32 ignites the air/fuel mixture. Exhaust resulting from combustion is expelled from the cylinder 22 via one or more exhaust valves, such as exhaust valve 34, to an exhaust system 36. One or more exhaust valves may be provided for each cylinder.

Figure 2:
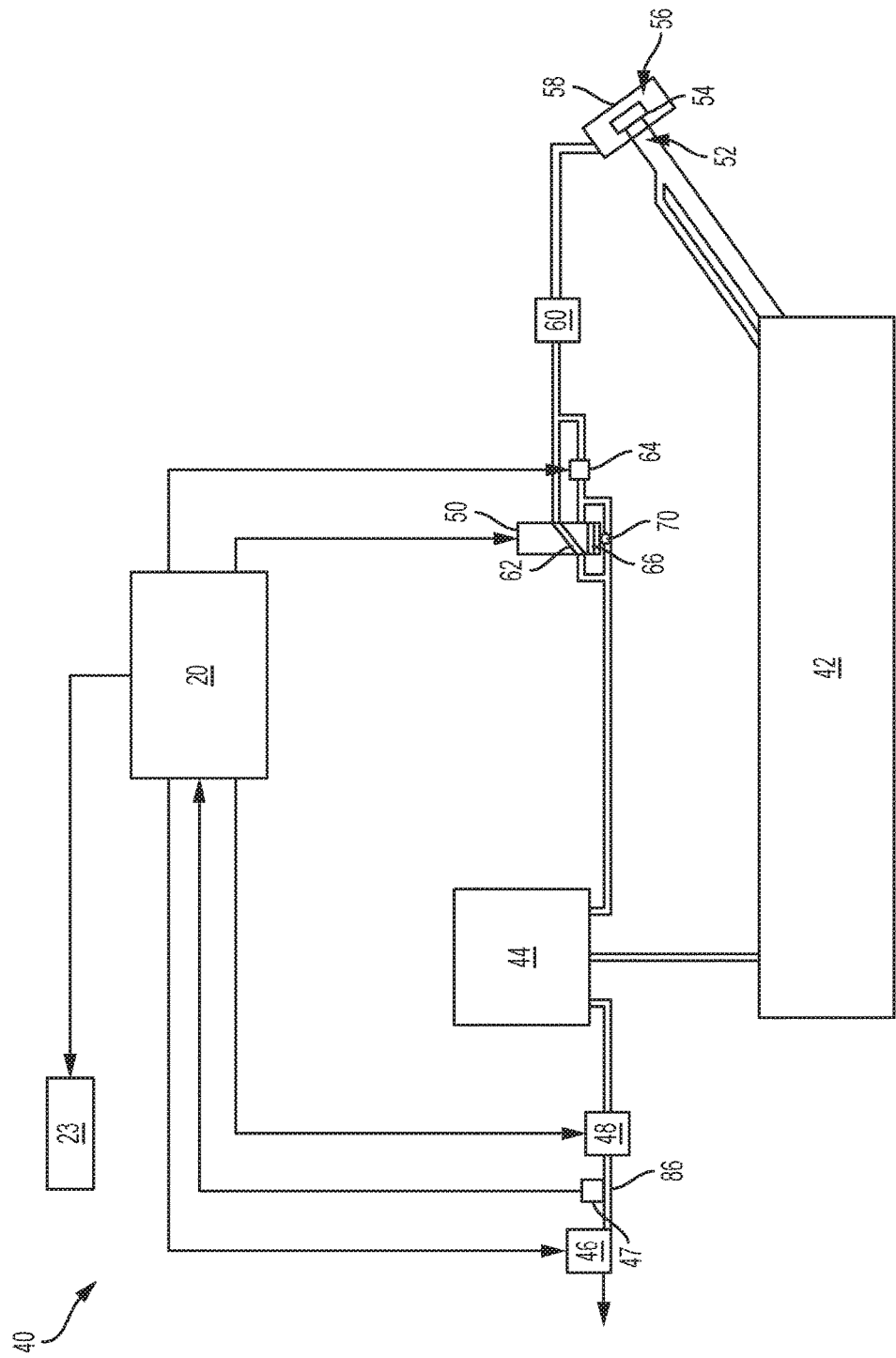
FIG. 2 illustrates an example fuel system and control system in accordance with the exemplary embodiment.

Referring now to FIG. 2, a functional block diagram of an example fuel system 40 is presented. The fuel system 40 supplies fuel to the engine 10. More specifically, the fuel system 40 supplies both liquid fuel and fuel vapor to the engine 10. The fuel system 40 includes a fuel tank 42 that contains liquid fuel. Liquid fuel is drawn from the fuel tank 42 and supplied to the fuel injectors of the engine 10 by one or more fuel pumps (not shown).

Some conditions, such as refueling, heat, vibration, and/or radiation, may cause liquid fuel within the fuel tank 42 to vaporize. A vapor canister 44 traps and stores vaporized fuel (fuel vapor). The vapor canister 44 may include one or more substances that trap and store fuel vapor, such as a charcoal.

A canister purge valve 46 includes a valve member that is selectively opened and closed to enable and disable, respectively, fuel vapor flow to the engine 10. In accordance with the exemplary embodiment, the canister purge valve 46 is normally closed. Operation of the engine 10 may create a vacuum relative to ambient pressure within the intake manifold 14.

In some instances, such as when one or more boost devices are increasing airflow into the engine 10, pressure within the intake manifold 14 may be greater than or approximately equal to ambient pressure. A pump 48 may be implemented that pumps fuel vapor from the vapor canister 44 to the canister purge valve 46. When the canister purge valve 46 is open, the pump 48 also pumps fuel vapor from the vapor canister 44 toward the engine 10.

The ECM 20 controls the canister purge valve 46 and the pump 48 to control the flow of fuel vapor to the engine 10. The ECM 20 may also control a canister vent valve 50.

When the canister vent valve 50 is in a closed position, the ECM 20 may selectively open the canister purge valve 46 and turn on the pump 48 connected to the canister purge valve 46 to purge fuel vapor from the vapor canister 44 to the intake system 12, thereby providing a vacuum pressure level in the evaporative emissions system.

In accordance with the exemplary embodiment, when the engine is on, the ECM 20 operates to monitor and regulate the vacuum pressure level in the evaporative emissions system to a predetermined minimum vacuum pressure level by controlling opening and closing the canister vent valve 50 with a variable pulse width modulated signal.

A pressure sensor 47 measures a vacuum pressure level at a location between the pump 48 and the canister purge valve 46 and is in communication with the ECM 20. The pressure sensor 47 may be disposed at the fuel tank or at the vapor canister to operate within the scope of the exemplary embodiment for monitoring the vacuum pressure level within the evaporative emissions system.

When the engine is turned off, the ECM 20 closes the canister vent valve 50 and a canister purge valve 46 and begins recording the vacuum pressure level over a predetermined time period, e.g., 1 to 3 minutes, after turning off the engine. If the vacuum pressure level is determined to become less than the predetermined minimum vacuum pressure level then a fault code is set in the ECM and a malfunction indicator lamp (MIL) will illuminate with ignition on.

Alternately, the ECM 20 may also control the rate at which fuel vapor is purged (a purge rate) by controlling opening and closing of the canister purge valve 46. For example only, the ECM 20 may control the canister purge rate by controlling a variable duty cycle of a signal applied to the canister purge valve 46. Ambient air flows into the vapor canister 44 as fuel vapor flows from the vapor canister 44 toward the intake system 12. As the canister vent valve 50 modulates to create vacuum in the tank, the canister purge valve 46 may operate as a higher duty cycle to maintain the desired flow rate.

Liquid fuel may be added to the fuel tank 42 via a fuel inlet 52. A fuel cap 54 seals the fuel inlet 52. The fuel cap 54 and the fuel inlet 52 may be accessed via a fueling compartment 56. A fuel door 58 may be implemented to shield and close the fueling compartment 56.

The ambient air provided to the vapor canister 44 through the canister vent valve 50 may be drawn from the fueling compartment 56. A filter 60 receives the ambient air and filters various particulate from the ambient air. The canister vent valve 50 may be actuated to the open canister vent position or the closed position. The canister vent valve 50 is shown as being in the canister vent position in the example of FIG. 2. When the canister vent valve 50 is in the canister vent position, air can flow from the filter 60 to the vapor canister 44 via a first path 62 through the canister vent valve 50. When the canister vent valve 50 is in the closed position, air can flow between a vacuum pump 64 and the vapor canister 44 via a second path 66 through the canister vent valve 50.

The canister purge valve 46 is directly coupled to a component of the intake system 12, such as the intake manifold 14 or an intake pipe through which air flows into the intake manifold 14. In engines having a boost device, the canister purge valve 46 may be directly coupled to a component upstream of the boost device.

Figure 3:
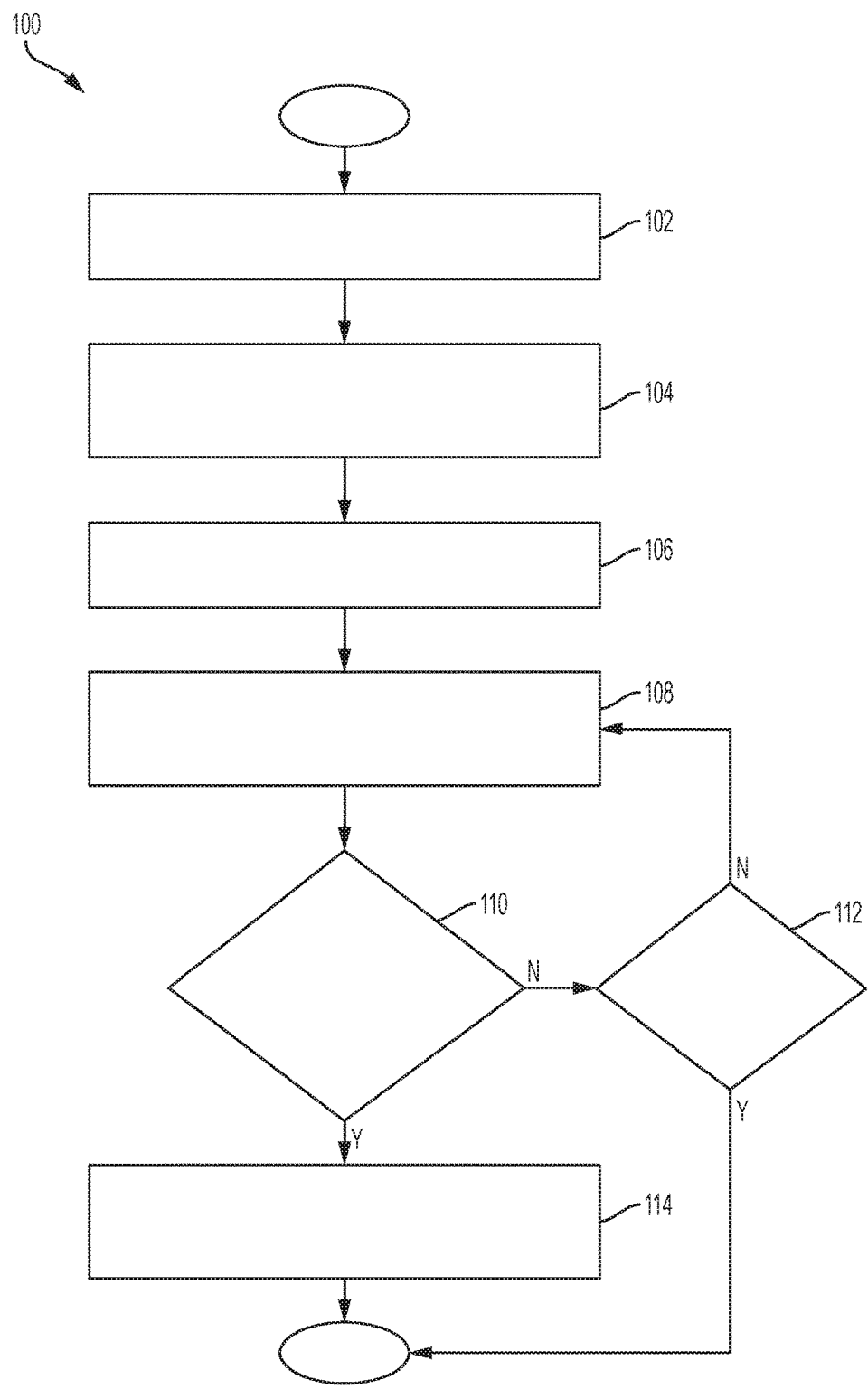
FIG. 3 is an algorithm of a method for small leak testing of an evaporative emissions system in accordance with the exemplary embodiment.

FIG. 3 is an algorithm 100 of a method for small leak testing of an evaporative emissions system in accordance with the exemplary embodiment. The method begins at block 102 with monitoring a vacuum pressure level of the evaporation emissions system with engine on. In conventional evaporative testing methodology, the pressure levels are monitored during engine off and after the pressure is purged before closing the system valves to allow pressure to generate due to heat from the engine emissions system. This heat generated pressure is then used to facilitate the leak testing. In accordance with aspects of the exemplary embodiment, this heat generated pressure is not required as it may not be available in more efficient engines.

At block 104, the method continues with actuating a canister vent valve to regulate the vacuum pressure level to a predetermined minimum vacuum pressure level. Actuating includes opening and closing the canister vent valve with a variable pulse width modulated signal to regulate the vacuum pressure level to a predetermined minimum level when the engine is on. In this manner, generation of heat to build pressure to facilitate the testing after the engine is turned off is not required. The method may also include actuating the canister vent valve between a fully open and a fully closed position to regulate the vacuum pressure level but this approach is less refined than using the pulse width modulation control actuation described above.

Alternatively, the vacuum pressure level may be regulated by controlling the duty cycle of a signal applied to the canister purge valve 46 when the canister vent valve 50 is restricted (i.e., in the closed position). It is appreciated that the results regarding regulation of the vacuum pressure level within the evaporative emissions system will be substantially equivalent to the actuation of the canister vent valve 50 approach using a variable duty cycle.

At block 106, the method continues with closing the canister vent valve and a canister purge valve when the engine is turned off to seal the system before starting the leak testing. At this point, no additional pressure is required to be added to the system because the method is operative to maintain a predetermined minimum vacuum pressure throughout the engine on/off process in accordance with aspects of the exemplary embodiment.

Next, at block 108, the method continues with recording the vacuum pressure level over a predetermined time period after turning off the engine. The recording is performed by the ECM that is in data communication with a pressure sensor disposed within the evaporative emissions system between the fuel tank and the canister purge valve. The predetermined time period for running the leak test and recording the results in accordance with the exemplary embodiment provides an energy efficiency advantage over the conventional leak testing methods as the disclosed method requires less time and energy to obtain results.

At block 110, the method continues with determining if the vacuum pressure level is/becomes less than the predetermined minimum level within the predetermined time period. If so, then at block 114, the method continues with setting a fault code or MIL when the vacuum pressure level becomes less than the predetermined minimum vacuum pressure level. The fault code and MIL will remain set until the engine is serviced. If the vacuum pressure is determined not to be less than the predetermined minimum vacuum pressure then, at block 112, the method determines if the predetermined time period for testing is expired. If so the method ends, but if not, then the method returns to block 108.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for small leak testing of an evaporative emissions system of an engine, the method comprising:
    monitoring a vacuum pressure level of the evaporation emissions system with the engine on;
    opening a canister purge valve and activating a pump, both of which are within the evaporative emissions system, to provide a vacuum pressure level;
    actuating a canister vent valve within the evaporative emissions system to regulate the vacuum pressure level to a predetermined minimum vacuum pressure level;
    closing the canister vent valve and the canister purge valve when the engine is turned off;
    deactivating the pump;
    recording the vacuum pressure level over a predetermined time period after the engine is turned off and the pump is deactivated; and
    setting a fault code when the vacuum pressure level becomes less than the predetermined minimum vacuum pressure level.

2. The method of claim 1 wherein monitoring further comprises monitoring the vacuum pressure level at a fuel tank within the evaporative emissions system using a pressure sensor.

3. The method of claim 1 wherein monitoring further comprises monitoring the vacuum pressure level at an evaporative emissions vapor canister within the evaporative emissions system using a pressure sensor.

4. The method of claim 1 wherein actuating further comprises opening and closing the canister vent valve with a variable pulse width modulated signal to regulate the vacuum pressure level.

5. The method of claim 1 wherein actuating further comprises actuating the canister vent valve between a fully open and a fully closed position to regulate the vacuum pressure level.

6. The method of claim 1 further comprises controlling duty cycle of a signal applied to the canister purge valve to regulate the vacuum pressure level when the canister vent valve is restricted.

7. The method of claim 1 wherein actuating further comprises actuating a purge pump to affect regulation of the vacuum pressure level.

8. The method of claim 1 wherein setting further comprises activating a malfunction indicator lamp when the vacuum pressure level becomes less than the predetermined minimum vacuum pressure level.

9. A method for small leak testing of an evaporative emissions system of an engine, the method comprising:
    monitoring a vacuum pressure level of the evaporation emissions system with the engine on;
    opening a canister purge valve and activating a pump, both of which are within the evaporative emissions system, to provide the vacuum pressure level;
    actuating a canister vent valve within the evaporative emissions system with a variable pulse width modulated signal to regulate the vacuum pressure level to a predetermined minimum vacuum pressure level;
    closing the canister vent valve and the canister purge valve when the engine is turned off;
    deactivating the pump;
    recording the vacuum pressure level over a predetermined time period after the engine is turned off and the pump is deactivated; and
    setting a fault code when the vacuum pressure level becomes less than the predetermined minimum vacuum pressure level.

10. The method of claim 9 wherein monitoring further comprises monitoring the vacuum pressure level at a fuel tank within the evaporative emissions system using a pressure sensor.

11. The method of claim 9 wherein monitoring further comprises monitoring the vacuum pressure level at an evaporative emissions vapor canister within the evaporative emissions system using a pressure sensor.

12. The method of claim 9 wherein actuating further comprises actuating the canister vent valve between a fully open and a fully closed position to regulate the vacuum pressure level.

13. The method of claim 9 further comprises controlling duty cycle of a signal applied to the canister purge valve to regulate the vacuum pressure level when the canister vent valve is restricted.

14. The method of claim 9 wherein actuating further comprises actuating a purge pump to affect regulation of the vacuum pressure level.

15. The method of claim 9 wherein setting further comprises activating a malfunction indicator lamp when the vacuum pressure level becomes less than the predetermined minimum vacuum pressure level.

* * * * *